(12) United States Patent
Wu

(10) Patent No.: US 6,757,805 B2
(45) Date of Patent: Jun. 29, 2004

(54) PARTITIONING METHOD FOR CONFIGURING A DATA STORAGE MEDIUM WITH A NUMBER OF VIRTUAL PARTITIONED AREAS

(76) Inventor: Yu-Te Wu, No. 42, Yung-Le 5th St., Chia-Yi City (TW)

( * ) Notice: Subject to any disclaimer, the term of this patent is extended or adjusted under 35 U.S.C. 154(b) by 196 days.

(21) Appl. No.: 10/153,822

(22) Filed: May 24, 2002

(65) Prior Publication Data

US 2003/0221054 A1 Nov. 27, 2003

(51) Int. Cl.[7] .............................................. G06F 12/08
(52) U.S. Cl. ..................................... 711/173; 711/112
(58) Field of Search ........................... 711/4, 111, 112, 711/170, 173

(56) References Cited

U.S. PATENT DOCUMENTS

| | | | |
|---|---|---|---|
| 6,272,611 B1 | 8/2001 | Wu | 711/173 |
| 6,330,653 B1 * | 12/2001 | Murray et al. | 711/173 |
| 6,526,493 B1 * | 2/2003 | Ding | 711/170 |
| 6,587,854 B1 * | 7/2003 | Guthrie et al. | 707/9 |
| 2002/0016812 A1 * | 2/2002 | Uchishiba et al. | 709/104 |
| 2003/0169445 A1 * | 9/2003 | Chu et al. | 358/1.15 |

FOREIGN PATENT DOCUMENTS

CN 1432921 A * 7/2003 ........... G06F/12/08

* cited by examiner

*Primary Examiner*—Kevin Verbrugge
(74) *Attorney, Agent, or Firm*—Jacobson Holman PLLC

(57) ABSTRACT

In a partitioning method for a data storage medium of an electronic device, the storage space of the data storage medium is configured with a number of virtual partitioned areas, each of which is adapted for storing files of a dedicated user. Each of the virtual partitioned areas only appears as a file name in a system region of the storage space, and does not occupy memory space when data is yet to be stored therein. During each data storing operation for one of the virtual partitioned areas, data that is associated with the data storing operation is stored in free portions of the storage space, and a corresponding entry is added to an address record table for the virtual partitioned area to indicate location of the data that is associated with the data storing operation.

4 Claims, 2 Drawing Sheets

PARTITIONING METHOD FOR CONFIGURING A DATA STORAGE MEDIUM WITH A NUMBER OF VIRTUAL PARTITIONED AREAS

BACKGROUND OF THE INVENTION

1. Field of the Invention

The invention relates to a partitioning method for a data storage medium, more particularly to a partitioning method for configuring a data storage medium with a number of virtual partitioned areas.

2. Description of the Related Art

A computer data storage medium, such as a hard disk drive, can be configured with a plurality of partitioned areas using a conventional partitioning scheme such that, when a single computer is shared by different users, each computer user can have a data storage space and an operating environment that are separate from those of the other computer users.

However, when the conventional partitioning scheme is used, each partitioned area of the data storage medium is allocated with a predetermined amount of storage space. Thus, when it is desired to change the sizes of the partitioned areas, the data stored therein should be moved before the sizes can be adjusted, thereby resulting in inconvenience and possible loss of data. Moreover, the conventional partitioning scheme lacks flexibility since it permits configuring of the data storage medium to a maximum of only four partitioned areas.

SUMMARY OF THE INVENTION

Therefore, the object of the present invention is to provide a partitioning method for configuring a data storage medium with a number of virtual partitioned areas so as to overcome the aforesaid drawbacks of the prior art.

According to the present invention, there is provided a partitioning method for a data storage medium of an electronic device. The data storage medium has a storage space with a system region for storing an operating system. The partitioning method comprises the steps of:

a) configuring the storage space of the data storage medium with a number of virtual partitioned areas, each of which is adapted for storing files of a dedicated user, wherein each of the virtual partitioned areas only appears as a file name in the system region and does not occupy memory space when data is yet to be stored therein;

b) during each data storing operation for one of the virtual partitioned areas, storing data that is associated with the data storing operation in free portions of the storage space of the data storage medium, and adding a corresponding entry to an address record table for said one of the virtual partitioned areas to indicate location of the data that is associated with the data storing operation; and c) when deleting data in a selected one of the virtual partitioned areas, deleting the entry corresponding to the data in the address record table for the selected one of the virtual partitioned areas.

Preferably, the location corresponding to the deleted entry is available for overwriting during a subsequent data storing operation for any of the virtual partitioned areas.

In the preferred embodiment, when deleting a selected one of the virtual partitioned areas, the address record table for the selected one of the virtual partitioned areas is deleted without deleting the data in the locations indicated by the entries in the address record table.

Moreover, when formatting a selected one of the virtual partitioned areas, the address record table for the selected one of the virtual partitioned areas is cleared without deleting the data in the locations indicated by the entries in the address record table.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
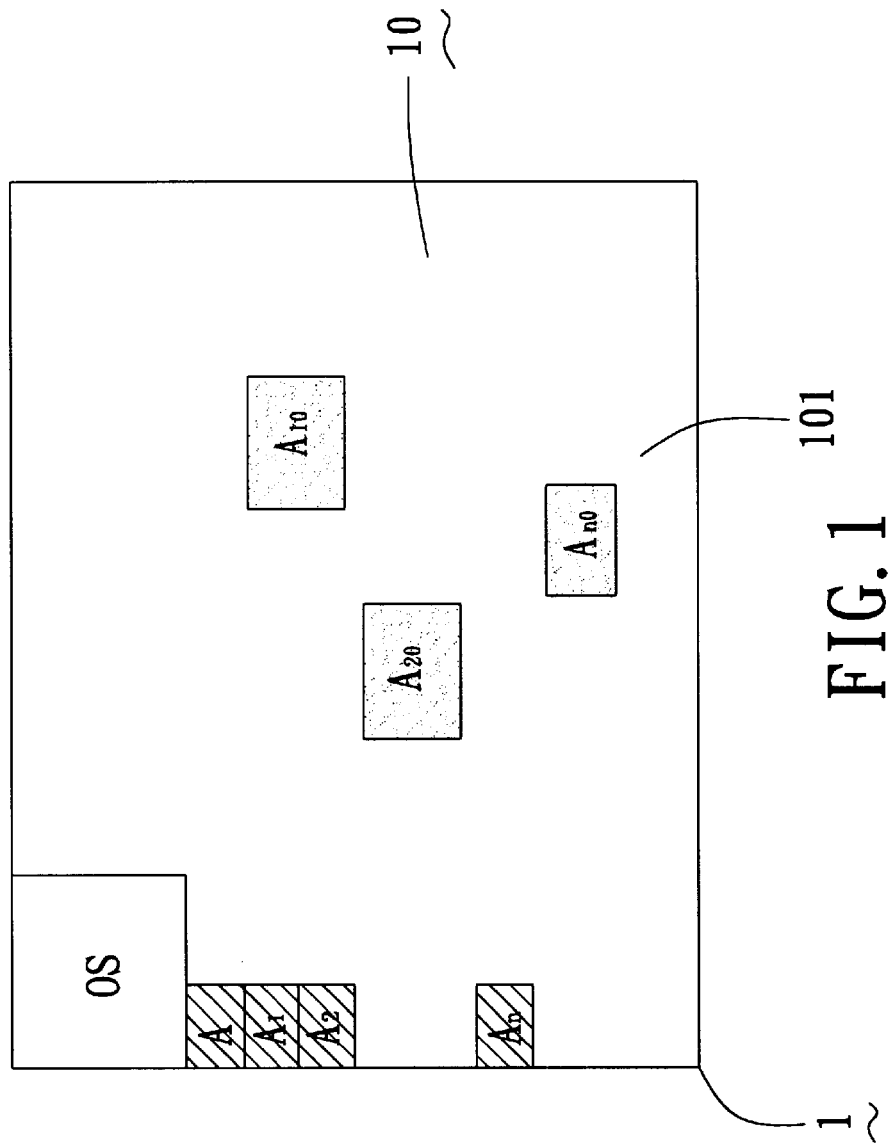
FIG. 1 is a schematic diagram illustrating how a first virtual partitioned area is distributed on storage space of a data storage medium that is configured according to the preferred embodiment of a partitioning method of the present invention.

Referring to FIG. 1, the preferred embodiment of a partitioning method according to the present invention is used to configure a data storage medium 1 of an electronic device, such as a hard disk drive of a computer. In the preferred embodiment, the storage space 10 of the data storage medium 1 has a system region (OS) for storing an operating system, and may be configured with a number of virtual partitioned areas, each of which is adapted for storing files of a dedicated user. When data is yet to be stored in the virtual partitioned areas, the virtual partitioned areas only appear as file names in the system region (OS) and do not occupy memory space. The different users of the virtual partitioned areas commonly share the system region (OS). Moreover, memory space not used by one of the users is available for use by the other users for data storage.

As shown in FIG. 1, when data is stored in a first virtual partitioned area (A), the data is written in free portions 101 of the storage space 10 of the data storage medium 1, and a corresponding entry $A_1, A_2, \ldots A_n$ will be added to an address record table that is associated with the first virtual partitioned area (A). In other words, during a first data storing operation for the first virtual partitioned area (A), an entry $A_1$ will be added to the address record table for the first virtual partitioned area (A) to indicate the location $A_{10}$ of the data that is associated with the first data storing operation. During second to nth data storing operations for the first virtual partitioned area (A), corresponding entries $A_2$ to $A_n$ will be added to the address record table for the first virtual partitioned area (A) to indicate the location $A_{20}$ to $A_{n0}$ of the data that is associated with the respective one of the second to nth data storing operations. The first virtual partitioned area (A) thus includes the entries $A_1$ to $A_n$ in the address record table and the locations $A_{10}$ to $A_{n0}$ of the data stored in the first virtual partitioned area (A). The size of the first virtual partitioned area (A) is dynamically adjusted according to the amount of data stored therein. Note that when the entry $A_1$ in the address record table for the first virtual partitioned area (A) is deleted, the associated location $A_{10}$ of the storage space 10 will be freed from the first virtual partitioned area (A). Likewise, when the entry $A_2$ in the address record table for the first virtual partitioned area (A) is deleted, the associated location $A_{20}$ of the storage space 10 will be freed from the first virtual partitioned area (A). When the locations $A_{10}$, $A_{20}$ are freed from the first virtual partitioned area (A), they will be, as a consequence, considered to be parts of the free portions 101 of the storage space 10 of the data storage medium 1, and will be available for overwriting during a subsequent data storing operation for any of the virtual partitioned areas. The entries $A_1$ to $A_n$ in the address record table and the locations $A_{10}$ to $A_{n0}$ of the data stored in the first virtual partitioned area (A) may be scattered throughout the storage space 10 and need not be in a contiguous data block.

Figure 2:
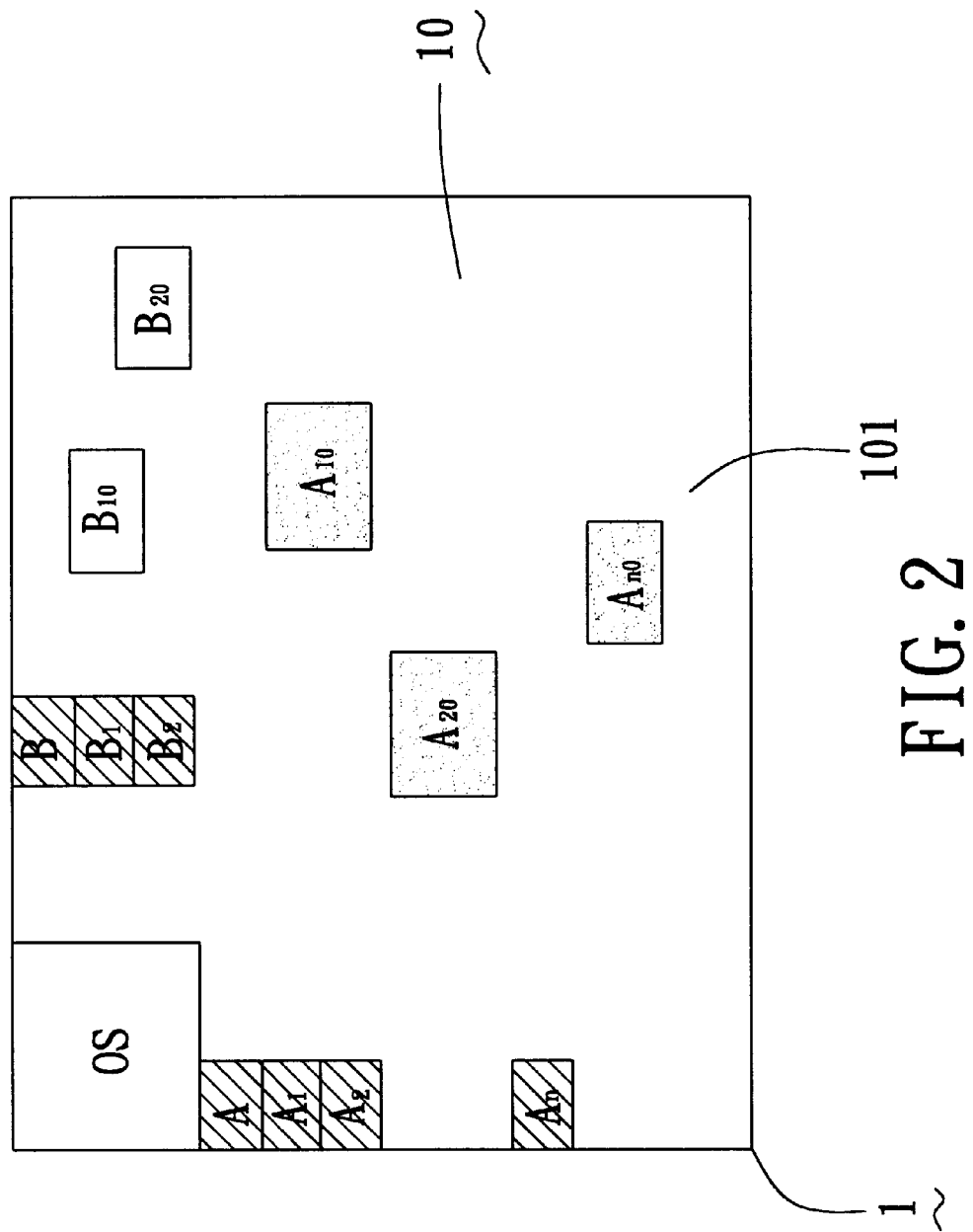
FIG. 2 is a schematic diagram illustrating how first and second virtual partitioned areas are distributed on the storage space of the data storage medium in accordance with the preferred embodiment.

Referring to FIG. 2, when the storage space 10 of the data storage medium 1 is further configured with a second virtual partitioned area (B), during first to nth data storing operations for the second virtual partitioned area (B), corresponding entries $B_1$ to $B_n$ will be added to the address record table for the second virtual partitioned area (B) to indicate locations $B_{10}$ to $B_{n0}$ of the data that is associated with the respective one of the first to nth data storing operations. The second virtual partitioned area (B) thus includes the entries $B_1$ to $B_n$ in the address record table and the locations $B_{10}$ to $B_{n0}$ of the data stored in the second virtual partitioned area (B). The second virtual partitioned area (B) has the same aforesaid characteristics of the first virtual partitioned area (A).

It is worthwhile to note that, when the storage space 10 of the data storage medium 1 is configured with a plurality of virtual partitioned areas according to this invention, the virtual partitioned areas do not overlap and affect each other. Thus, each virtual partitioned area is available for use by a dedicated user independently of the other virtual partitioned areas. When configuring a new virtual partitioned area, since it is only required to establish an address record table for the same, the configuring time can be dramatically reduced. Moreover, an inheritance concept is employed in the partitioning method of this embodiment such that the new virtual partitioned area can inherit the operating system of existing virtual partitioned areas. Therefore, there is no need for repeated installation of the same operating system in the storage space 10 of the data storage medium 1 according to the partitioning method of this invention.

Furthermore, when it is desired to delete a selected one of the virtual partitioned areas, it is only required to delete the address record table for the selected one of the virtual partitioned areas. There is no need to delete the data in the locations indicated by the entries in the address record table for the selected virtual partitioned area. The space originally occupied by the deleted virtual partitioned area will be, as a consequence, considered to be apart of the free portions 101 of the storage space 10 of the data storage medium 1, and will be available for overwriting during a subsequent data storing operation for any of the remaining virtual partitioned areas.

Moreover, when the storage space 10 of the data storage medium 1 is configured using the partitioning method of this invention, it is possible to format selected ones of the virtual partitioned areas without affecting the non-selected virtual partitioned areas. Particularly, when it is desired to format a selected one of the virtual partitioned areas, it is only required to clear the address record table for the selected one of the virtual partitioned areas. Likewise, there is no need to delete the data in the locations indicated by the entries in the address record table for the selected virtual partitioned area.

It is also noted that the partitioning concept of this invention can be extended to further configure a virtual partitioned area into a number of virtual partitioned subareas.

Besides, when the system region (OS) of the storage space 10 of the data storage medium 1 further has a second operating system, such as UNIX, stored therein, the partitioning method of this invention can be applied to additionally configure the storage space 10 of the data storage medium 1 into another number of the virtual partitioned areas under the platform of the second operating system.

In sum, the following are some of the advantages of the partitioning method for configuring a data storage medium according to this invention:

1. When the partitioning method of this invention is employed to configure the storage space of the data storage medium, the resulting virtual partitioned areas have dynamically adjustable sizes and are not allocated with fixed sizes of memory space, thereby eliminating the drawbacks associated with partitioned areas having fixed sizes.

2. There is no limit in the number of virtual partitioned areas that can be configured when the storage space of the data storage medium is configured using the partitioning method of this invention.

3. By simply deleting an address record table or an entry of a selected address record table, memory space can be quickly and easily freed when the storage space of the data storage medium is configured using the partitioning method of this invention.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A partitioning method for a data storage medium of an electronic device, the data storage medium having a storage space with a system region for storing an operating system, said partitioning method comprising the steps of:

a) configuring the storage space of the data storage medium with a number of virtual partitioned areas, each of which is adapted for storing files of a dedicated user, wherein each of the virtual partitioned areas only appears as a file name in the system region and does not occupy memory space when data is yet to be stored therein;

b) during each data storing operation for one of the virtual partitioned areas, storing data that is associated with the data storing operation in free portions of the storage space of the data storage medium, and adding a corresponding entry to an address record table for said one of the virtual partitioned areas to indicate location of the data that is associated with the data storing operation; and c) when deleting data in a selected one of the virtual partitioned areas, deleting the entry corresponding to the data in the address record table for the selected one of the virtual partitioned areas.

2. The partitioning method as claimed in claim 1, wherein, in step c), the location corresponding to the deleted entry is available for overwriting during a subsequent data storing operation for any of the virtual partitioned areas.

3. The partitioning method as claimed in claim 1, further comprising the step of:

d) when deleting a selected one of the virtual partitioned areas, deleting the address record table for the selected one of the virtual partitioned areas without deleting the data in the locations indicated by the entries in the address record table for the selected one of the virtual partitioned areas.

4. The partitioning method as claimed in claim 1, further comprising the step of:

e) when formatting a selected one of the virtual partitioned areas, clearing the address record table for the selected one of the virtual partitioned areas without deleting the data in the locations indicated by the entries in the address record table for the selected one of the virtual partitioned areas.

\* \* \* \* \*